June 14, 1949.    L. B. KING    2,473,376
SOAP TRAY
Filed May 15, 1946

Laurie B. King
Inventor

By Paul Eaton
Attorney

Patented June 14, 1949

2,473,376

UNITED STATES PATENT OFFICE 2,473,376

SOAP TRAY

Laurie B. King, Greensboro, N. C.

Application May 15, 1946, Serial No. 669,873

4 Claims. (Cl. 45—28)

This invention relates to a soap receptacle and the like adapted to be supported between the two spigots of a lavatory, kitchen sink, and the like.

It is an object of this invention to provide a soap dish having a pair of spring pressed members extending from each end thereof, and which members are slidable, and have suitable pockets or gaps disposed in their ends adapted to fit against the spigots of a lavatory, wash stand, kitchen sink and the like to hold it in position, and to cause it to be adaptable to various types of wash stands, sinks, lavatories and the like even though the spigots may vary in their distances apart from each other.

It is another object of this invention to provide a soap dish adapted to be suspended between and supported by the spigots of a kitchen sink, lavatory, wash stand, and the like and being divided into two portions for simultaneously accommodating different cakes of soap at the same time, and having raised portions and perforations whereby the raised portions will support the soap removed from the main bottom portion of the dish, and allow air to pass between the soap cake and the main portion of the device, the perforations allowing water and dissolved soap to drip through and these drippings can be caught in a drip pan, and used for laundering or dish washing, if desired, or can be allowed to drip onto the lavatory, sink and the like. The drip pan is removable for cleaning purposes, and can be used or not used, as desired.

It is another object of this invention to provide a soap receptacle adapted to be supported between two spigots of a kitchen sink and the like, said receptacle having a pair of slidable members mounted in each end and normally pressed away from each other by suitable compression springs, so as to cause the members to engage a spigot adjacent each end of the receptacle for supporting the same.

Some of the objects of the invention having been stated, other objects will appear as the description proceeds, when taken in connection with the accompanying drawings, in which—

Figure 1 is a top plan view of the apparatus omitting the drip pan, and showing the apparatus disposed between two conventional spigots of a lavatory, kitchen sink and the like;

Figure 1:
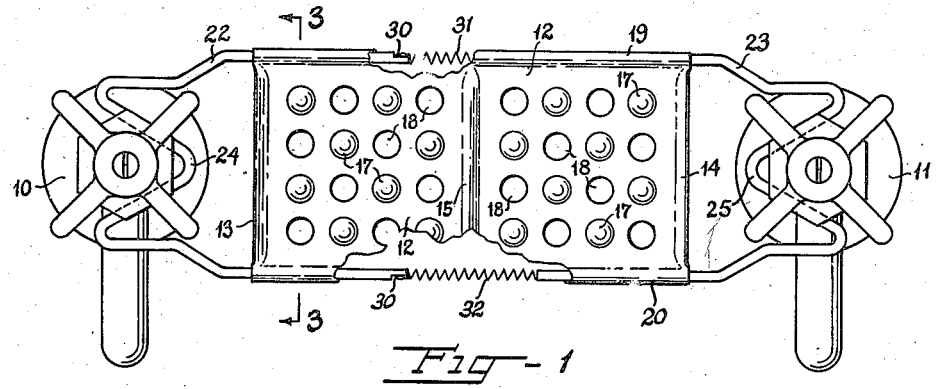
Figure 2:
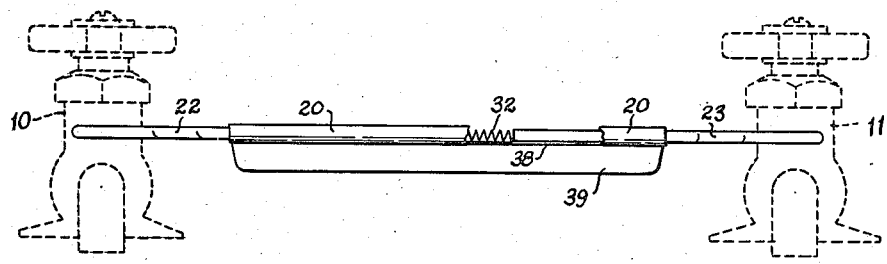
Figure 2 is a front elevation of the apparatus showing the spigots in dotted lines.
Figure 3:
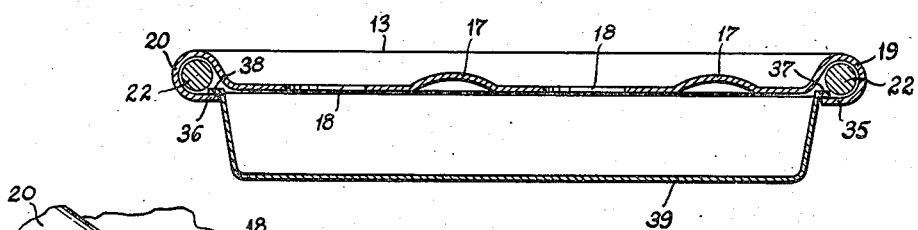
Figure 3 is a cross sectional view taken substantially along the line 3—3 in Figure 1.
Figure 4:
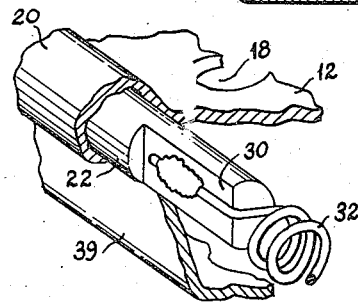
Figure 4 is an isometric view looking towards the left at the lower left central portion of Figure 1.

Referring more specifically to the drawings, the numerals 10 and 11 indicate a pair of spigots, which are usually associated with a lavatory, kitchen sink, and the like. I have provided a soap receptacle 12, which has raised portions 13 and 14 at each end thereof and a central raised rib 15 dividing the member 12 into two divisions, so that different cakes of soap can be supported in each division. Each end of the member 12 has a plurality of raised portions 17 and a plurality of holes 18.

The front and rear portions of the member 12 are curled, as at 19 and 20, to form passageways in which substantially U-shaped members 22 and 23 have sliding movement. These members 22 and 23 are reversely bent, as at 24 and 25, to form recesses for fitting against the spigots 10 and 11 respectively.

The free ends of the U-shaped member 22 are flattened, as at 30, and have welded or otherwise secured thereto one end of springs 31 and 32, the other end of these springs fitting against the free end of U-shaped member 23, the spring being confined within the curled portions 19 and 20 and the U members 22 and 23 having sliding movement in these curled or channel portions 19 and 20.

The curled portions 19 and 20 project inwardly and horizontally towards each other, as at 35 and 36, and are adapted to support the outwardly flanged portions 37 and 38 of a drip pan 39, which is adapted to slide into position, and be supported by the horizontal portions 35 and 36. This drip pan catches all drippings from the member 12, which pass through the perforations 18, and when the device is disassociated from the spigots 10 and 11, it can be slid out from its position for cleansing purposes.

In the drawings and specification, there has been set forth a preferred embodiment of the invention, and although specific terms have been employed, they are used in a generic and descriptive sense only, and not for purposes of limitation, the scope of the invention being defined in the claims.

I claim:

1. A soap receptacle comprising a tray for supporting a cake of soap, said tray having tubular channels in each side thereof, a slidable U-shaped member for each end of the tray and having its legs mounted in the ends of the channels and each U-shaped member having a recess in its outer end adapted to fit against a spigot of a lavatory and the like, compression springs disposed at said channels between the proximate ends of the slidable members for urging the slidable members outwardly against the spigots to support the soap receptacle.

2. A soap receptacle comprising a perforated tray member for supporting a cake of soap, said perforated tray member having tubular channels in each side thereof, a slidable U-shaped member having its legs mounted in each end of the channels and having a recess in its outer end adapted to fit against a spigot of a lavatory and the like, compression springs disposed in said channels between the slidable members for urging the slidable members outwardly against the spigots to support the perforated member, said springs being secured to one of the slidable members and said receptacle having a plurality of raised portions in its bottom portion and also having a plurality of perforations in its bottom portion.

3. A soap receptacle adapted to be supported by two separated spigots, comprising a tray member having tubular channels in each of its side portions, a member for each end of the tray member and having legs slidably supported in each end of the channels, said members having a recess in their outer ends adapted to fit against the spigots, compression springs disposed in said channels and between the proximate ends of said legs for pressing said members away from each other and to cause the recesses to engage the spigots.

4. A soap receptacle comprising a tray having its side portions crimped into the form of tubular portions and having its end portions elevated, and having a transverse raised rib intermediate its ends dividing the tray into two sections, the bottom of the tray having a plurality of raised portions for supporting cakes of soap and also having a plurality of perforations to allow drainage of water therethrough, a pair of substantially U-shaped members having their legs slidably mounted in said channel portions and each having a reversely bent portion in its outer end for fitting around a spigot, compression springs mounted in said channels and fitting against the proximate ends of said legs for forcing them apart from each other and causing the reversely bent portions in the outer ends of the U-shaped members to resiliently engage the spigots.

LAURIE B. KING.

REFERENCES CITED

The following references are of record in the file of this patent:

UNITED STATES PATENTS

| Number | Name | Date |
|---|---|---|
| 777,256 | Holden | Dec. 13, 1904 |
| 950,559 | Riegger | Mar. 1, 1910 |
| 1,249,603 | Dennis | Dec. 11, 1917 |
| 1,309,965 | Schwab | July 15, 1919 |
| 2,268,392 | Gustafson et al. | Dec. 30, 1941 |